Dec. 19, 1967    T. R. O'MEARA    3,359,480
SYNCHRONOUSLY CONTROLLED RESONANT AC TO AC CONVERTER
Filed May 23, 1966    4 Sheets-Sheet 1

Thomas R. O'Meara,
INVENTOR.
BY
J. K. Haskell
ATTORNEY.

Dec. 19, 1967  T. R. O'MEARA  3,359,480
SYNCHRONOUSLY CONTROLLED RESONANT AC TO AC CONVERTER
Filed May 23, 1966  4 Sheets-Sheet 2
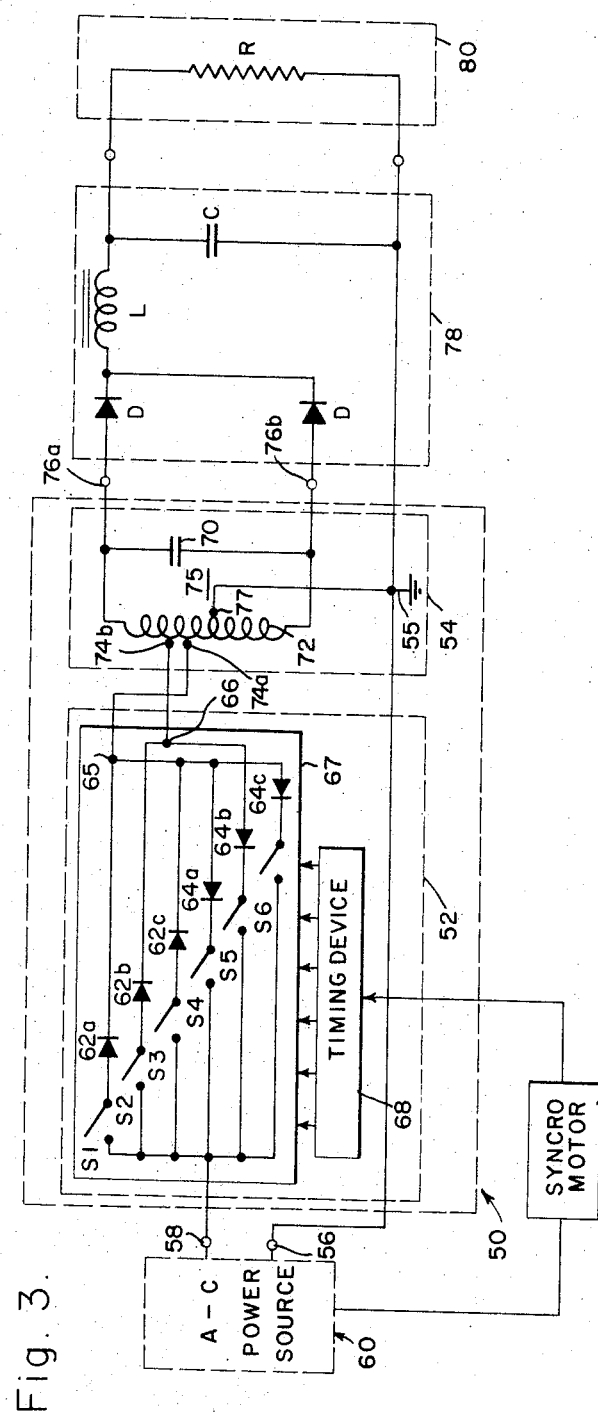
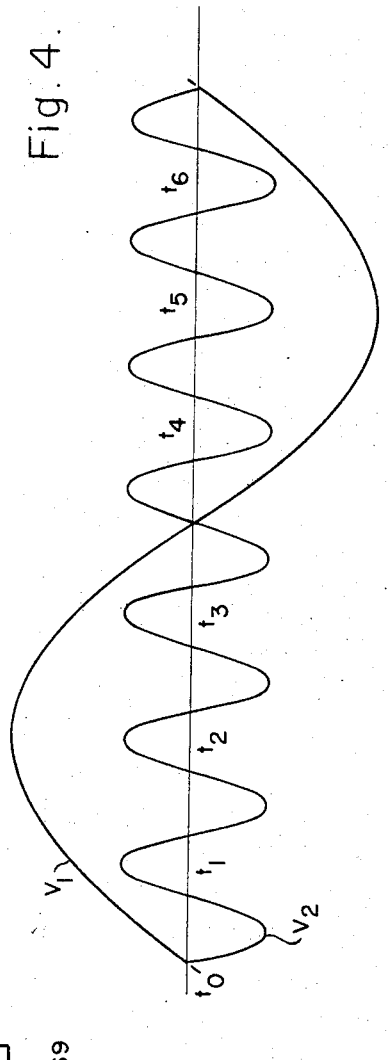
Thomas R. O'Meara,
INVENTOR
BY
J. K. Haskell
ATTORNEY.

Dec. 19, 1967     T. R. O'MEARA     3,359,480
SYNCHRONOUSLY CONTROLLED RESONANT AC TO AC CONVERTER
Filed May 23, 1966     4 Sheets-Sheet 3

Thomas R. O'Meara,
INVENTOR.

BY
*J. K. Haskell*

ATTORNEY.

Thomas R. O'Meara,
INVENTOR.

United States Patent Office 3,359,480
Patented Dec. 19, 1967

3,359,480
SYNCHRONOUSLY CONTROLLED RESONANT AC TO AC CONVERTER
Thomas R. O'Meara, Malibu, Calif., assignor to Hughes Aircraft Company, Culver City, Calif., a corporation of Delaware
Filed May 23, 1966, Ser. No. 559,675
3 Claims. (Cl. 321—4)

ABSTRACT OF THE DISCLOSURE

AC to AC conversion is accomplished by switch modulating an AC input voltage. A control device is used to alternately and synchronously control the switching. The voltage source is applied to rectifier devices at spaced time intervals. This voltage is then applied to a tuned resonator circuit which rings out at an odd multiple of the input frequency. The resulting output signal is an AC frequency which is the multiple of the input frequency.

---

This application is a continuation-in-part of application Ser. No. 254,177, filed Jan. 28, 1963, of the same title, now abandoned.

This invention relates generally to energy converters and more particularly to a synchronous inverter wherein the input power is switch modulated and fed at a controlled time to a resonator to effect frequency conversion.

In the prior art, one device converts a low frequency signal to a higher frequency signal by first rectifying and then filtering the low frequency input voltage. The resultant DC voltage is then chopped into a rectangular waveform of the desired frequency transformed in amplitude, if desired and finally filtered to remove other than the fundamental component of the desired higher frequency output voltage. The low frequency filter required for prior art inverters of this type necessarily must be heavy and bulky, which is an intolerable disadvantage for many applications where space and weight requirements are limited.

In the synchronous inverter of the present invention, both the conventional low frequency input transformer and the LC filter are eliminated, and therefore maximum reduction in weight and size compared to the prior art devices is achieved. Here, an electrical voltage or energy from a low frequency source, as for example, a commercial power line, is switch modulated to pass a selected portion of the voltage or energy synchronously to a resonator during predetermined spaced time intervals, such intervals controlled by a timing network. The resonator frequency or the output frequency of the inverter is an odd multiple of the frequency of the input voltage. This is the only constraint imposed upon the present invention.

The ripple content in the AC output voltage of the present inverter is a function of the frequency ratio chosen; that is, the larger this ratio, the less is the percentage ripple and the smaller in weight and size are the components of the inverter, especially the resonator. By operating the present inverter from a 3-phase power source, the percentage ripple in the AC-output voltage as is achieved in, for example, conventional power supplies is further reduced. Moreover, should it be desired to convert the AC output voltage to a DC voltage, then smaller also would be the LC filter required. In this event, the result is a light, compact AC-DC power supply.

In one aspect of the present invention, there is shown a synchronous inverter capable of oscillating at some multiple of a power source of angular frequency $w_s$, comprising, in combination resonator means with electromagnetic coupling capable of resonating at an odd multiple of the angular frequency $w_s$, a timing device, and a time-dependent switching means operated by the timing device and disposed between the power source and the resonator means for providing a path to selectively transmit energy from the power source to the resonator means during predetermined timed intervals.

It is therefore an objective of the present invention to provide a synchronous inverter of the type to be described, wherein the need for conventional input transformer and LC filter is obviated.

It is another objective of the present invention to provide a light and compact synchronous inverter wherein the input power is switch modulated by a timing device and coupled to a resonator capable of operating and synchronized at an odd multiple of the frequency of the input power.

It is still another object of the present invention to provide a synchronous inverter of the type described wherein substantially equal amounts of energy are transmitted at intervals to the resonator to minimize the ripple content in the AC output.

The above and other features, objects and advantages of the present invention will appear from the following description of an exemplary embodiment thereof illustrated in the accompanying drawings wherein like characters refer to like parts and wherein:

FIG. 3 is a schematic diagram of another embodiment of a synchronous inverter of the present invention;

FIG. 4 shows the waveforms of the input and output voltages utilized in the embodiment of FIG. 3;

Figure 1:
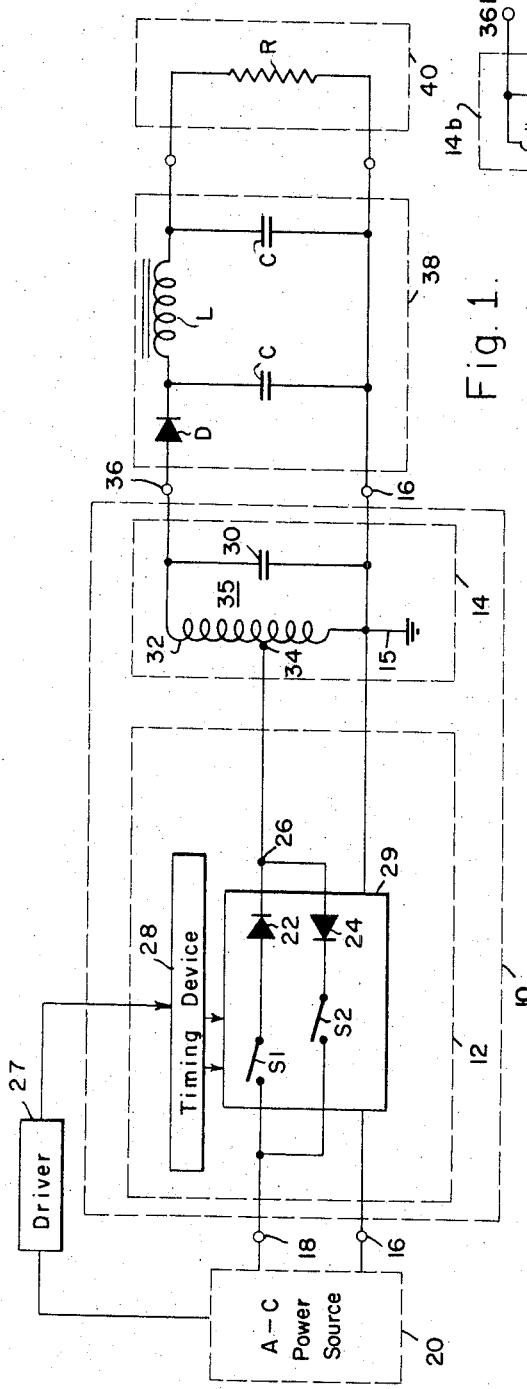
FIGURE 1 is a schematic diagram of one embodiment of a synchronous inverter of the present invention.

In FIG. 1, there is shown a synchronous inverter 10 including a timing device 28 within a switching apparatus 12 and a resonator 14. The switching apparatus 12 includes two input terminals 16 and 18 to which a source 20 of alternating current voltage of angular frequency $w_s$ may be coupled. The terminal 16 is connected to ground potential 15 and to the resonator 14 by conventional means. Interruptor means 29 is shown within the switching apparatus 12 between timing device 28 and the resonator 14.

Two switches S-1 and S-2 are provided as an interruptor 29 in the switching apparatus 12, and one side of the switches S-1 and S-2 is commonly connected to the terminal 18. The other sides of the switches S-1 and S-2 are separately connected to non-linear devices as, for example, diodes 22 and 24 respectively. The diodes 22 and 24 are oppositely poled and commonly joined at a junction point 26. The switching apparatus 12 also includes a timing device 28 to provide time-based control for the actuation of the switches S-1 and S-2 such that a selected amount of electrical energy is passed through the diodes 22 and 24 during respective times intervals $t_1$ and $t_2$ shown in FIG. 2. The driver 27 is synchronized with the AC source to affect appropriate operation of the timing device 28. This driver may be a conventional synchronous motor having a shaft coupled to the timing device where the timing device is a mechanically operated rotary switch. Where the timing device is not mechanical, but independently operating, such driver is not essential. This switching apparatus 12, including the timing device 28, may be composed entirely of electronic devices by substituting conventional diode gating and transistor switching, wherein the gating and switching is time-based upon the angular frequency $w_s$ or harmonic of $w_s$; such an embodiment is described later in this application with regard to FIG. 9.

The resonator 14 may include a capacitor 30 connected in parallel to an inductive winding 32 to form a high-Q circuit 35 resonant at an angular frequency $w_o$ as for example $3w_s$. The resonator 14 is shock-excited by the energy increments passing through the switching apparatus and rings at the frequency $w_o$ with a time decaying envelope. As the loaded Q ($Q_L$) increases then the decay time for the resonator diminishes. The ripple content includes harmonics of $w_o$ and $w_s$. The ripple harmonics of $w_o$ is easily removed by conventional means; however, the ripple from the source may be removed also by conventional filtering. For example, with the loaded Q equal to 150 and the ratio of $w_o/w_s$ equal to 5, about 10 percent ripple is obtained. However, as the unloaded Q ($Q_L$) reaches five to ten times higher than $Q_L$, then large unloaded Q's are required. As is well known in the art, mechanical resonators such as tuning forks easily achieve $Q_L$ of more than 2,000 at 300 cycles and higher. Thus, in principle, the resonator 14 may be wholly or partially mechanically resonant and is described later with relationship to FIG. 7 and FIG. 8. A tap 34 at a point intermediate the ends of the winding 32 is connected to the diodes 22 and 24 at the junction 26 in a conventional manner. Opposite plates of the capacitor 30 form the output terminals 36 and 16 across which the output voltage $V_2$, FIG. 2, of the inverter 10 may be observed.

FIG. 1 further shows a conventional AC to DC conversion network 38 coupled to the inverter 10 at its output terminals 36 and 16 and illustrates schematically how the inverter 10 may be used to drive a DC load 40.

In a second embodiment shown in FIG. 3, a synchronous inverter 50 having a switching apparatus 52 and a resonator 54 is provided. The inverter 50 includes two input terminals 56 and 58 for receiving electrical energy of an angular frequency $w_s$ from a power source 60 which may be a commercial power line. The terminal 56 is earth grounded at a point 55.

The switching apparatus 52 includes an interruptor 67, the interruptor carrying a plurality of electrical conducting paths connected to the terminal 58 and terminating at one side of a plurality of switches, S–1, S–2 . . . S–6. For reasons to be described, six such switches are provided as part of the interruptor and singly connected in series to a non-linear device for rectification, as for example, to one of the oppositely poled diodes 62 and 64. Other commercially available non-linear devices, such as thyratrons, controlled silicon rectifiers, may be suitably substituted for the diodes 62 and 64 and the diodes 22 and 24 of FIG. 1. In FIG. 3, one group of the diodes 62 and 64, namely the diodes 62a, 62c, 64a and 64c, is commonly connected at a junction point 65; another group, namely the diodes 62b and 64b, is similarly connected at a junction point 66. Each of the switches S–1 through S–6 is actuated in a controlled sequence by the timing device 68 during the time intervals $t_1$ through $t_6$ respectively, as shown in FIG. 4.

The resonator 54 may include a capacitor 70 connected in parallel to an inductive winding 72 to form a high-Q circuit 75 resonant at an angular frequency $w_o$, as for example $7w_s$. The taps 74a and 74b are disposed along the winding 72 intermediate one end thereof and a grounded center tap 77. The tap 74b is coupled to the junction point 66 and is disposed farther from the center tap 77 than the tap 74a which, in a similar manner, is coupled to the junction point 65. A conductive path extends from the opposite ends of the winding 72 to form the output terminals 76a and 76b of the inverter 50 across which terminals the output voltage $V_2$, FIG. 4, may be detected.

As in FIG. 1, a conventional rectifying and filtering apparatus 78 is shown in FIG. 3 coupled to the output terminals 76a and 76b of the inverter 50 to exemplify how a DC load 80 may be driven by the present invention. It is noted that, since the AC input to the apparatus 78 is higher in frequency than in conventional AC to DC power supplies, the weight and size of the passive components of the apparatus 78, assuming comparable power handling capacities, is substantially reduced. The larger the ratio of $w_s$ to $w_o$ (i.e.: the larger number of energy transfer periods) the smaller the transformer coupling becomes and the size of filters of apparatus 78. The preceding statement is applicable to the network 38 of FIG. 1.

Figure 2:
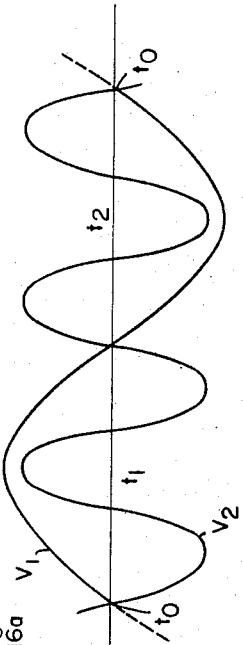
FIG. 2 is a waveform diagram of the input and output voltages of the embodiment of FIG. 1.

FIGS. 2 and 4 show the input and output voltages $V_1$ and $V_2$ of the synchronous inverters 10 and 50 of FIGS. 1 and 3. It will be noted that the voltage vectors are time varying in the same direction during the time intervals $t_1$ and $t_2$ in FIG. 2 and during the additional time intervals $t_3$ to $t_6$ in FIG. 4. At all other times, the vectors are oppositely directed, the absolute values of both passing through zero three times and in synchronism with every cycle of the input voltage $V_1$ as for example at the instant $t_0$.

Such a relationship is preferred and is readily achieved by restricting the ratio R of the output frequency $w_o$ to the input frequency $w_s$ to an odd integer. In FIGS. 2 and 4, the frequency ratio R obviously is 3 and 7 respectively. Note also that the number of time intervals during which the voltage vectors are time varying in the same direction is one less than the frequency ratio R. Thus, in FIGS. 2 and 4 respectively, there are 2 and 6 such time intervals respectively.

In FIG. 2, the absolute value of the input voltage $V_1$ averaged over the time interval $t_1$ is theoretically the same as that averaged over the time interval $t_2$. In FIG. 4, however, this absolute value is much greater during the time intervals $t_2$ and $t_5$ than during the time intervals $t_1$, $t_3$, $t_4$, and $t_6$. Expressed in another way, the area under the input voltage $V_1$ waveform in FIG. 4 is clearly larger during either of the time intervals $t_2$ and $t_5$ than the area during any one of the time intervals $t_1$, $t_3$, $t_4$, and $t_6$. This means that a higher average voltage is present at the junction 66 than at the junction 65. By coupling the junctions 65 and 66 to the taps 74a and 74b, as described above, substantially equal amounts of energy preferably may be periodically transmitted to the resonator 54 and, as a result, the ripple content in the output voltage $V_2$ is minimized. Thus, it is now apparent why six switches S–1, S–2, . . . S–6 and six diodes 62 and 64 were provided in the interruptor 67 of FIG. 3. Of course, the entire switching apparatus 52, including the timing device 68, may be composed entirely of valve or solid state electronic devices by substituting, for example, conventional diode gating, and transistor switching is time-based upon the angular frequency $w_s$ or harmonic of $w_s$.

As set forth above, the frequency ratio R may be any odd integer. Having chosen R, there then exists $R-1$ time intervals during any one cycle of the input voltage $V_1$ when, for example, energy may be transmitted to the resonators 14 or 54. In addition, the number of different absolute values of the input voltage $V_1$, as separately averaged over each of the $R-1$ time intervals, is also dependent upon the choice of the frequency ratio R. Thus, a number E of energy levels and hence, for example, the number of transformer taps T required is ascertainable in accordance with the following expression:

$$T = \frac{1}{4}\left[R + (-1)^{\frac{R+1}{2}}\right]$$

For the given values of R in Table I, the number of time intervals $t$ and the number of energy levels E or of resonant transformer taps T are compiled.

TABLE I

| Frequency Ratio | Number of Time Intervals, t | Number of Energy Levels E (also T) |
|---|---|---|
| 3 | 2 | 1 |
| 5 | 4 | 1 |
| 7 | 6 | 2 |
| 9 | 8 | 2 |
| 11 | 10 | 3 |
| 13 | 12 | 3 |
| 15 | 14 | 4 |
| 17 | 16 | 4 |
| R | (R−1) | $\frac{1}{4}\left[R+(-1)^{\frac{R+1}{2}}\right]$ |

Figure 5:
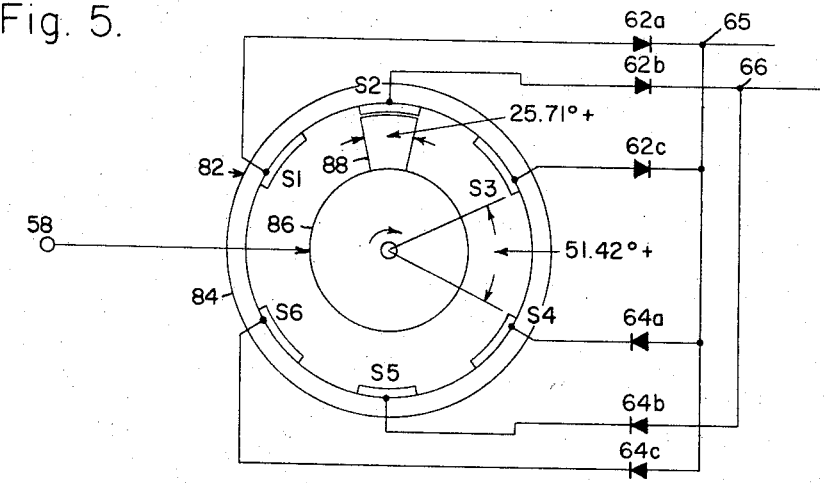
FIGS. 5 and 6 show in diagrammatic form a conventional rotary switch which may be used at the timing networks of FIGS. 3 and 1 respectively.

In FIG. 5, there is shown a rotary switch 82 of a type suitable for use as the timing device 68 and interruptor 67 of FIG. 3. The rotary switch 82 comprises a circular frame member 84 along the inner periphery of which are disposed the switches S–1, S–2, S–3, . . . S–6 serving as the interruptor and each preferably having an arc length defined by an angle of approximately 25.7143 electrical degrees, to establish the timing for the input voltage $V_1$. A rotatable member 86 serves as a timing control device disposed axially within the frame member 84 carries a contact element 88 as a switch control and also extending over an arc angle of approximately 25.7143 electrical degrees. A driving means, such as the synchronous motor 69 of FIG. 3 may be used to control the angular displacement of the contact element 88 clockwise relative to establish switching at the switches S–1 through S–6, and such angular displacement to take place during a synchronized time interval.

In FIG. 5, the switches S–1, S–2 and S–3 and the switches S–4, S–5 and S–6 are separated from each other by an angle of approximately 25.7143 electrical degrees; the switches S–1 and S–6 and the switches S–3 and S–4, however, are separated from each other by twice this angle or approximately 51.4285 electrical degrees. For satisfactory operation, the rotatable member 86 may be driven at an angular speed, for example, of 3600 r.p.m. where a 60 cycle per second power source supplies the input voltage $V_1$. Thus, as the contact element 88 advances through 360 mechanical degrees, the input voltage $V_1$, applied at the terminal 58, advances in time through a full cycle or 360 electrical degrees, and a controlled continuous conductive path is established from the input terminal 58 through a slip ring, not shown, mounted on the rotatable member 86 to the contact element 88 and hence through the switches S–1, S–2, . . . S–6 in sequence during the time intervals $t_1$, $t_2$, . . . $t_6$ respectively, reference FIG. 4, to one or the other of the junction points 65 and 66. It is to be noted that vernier means, not shown, may be provided for positioning the circular frame member 84, and hence the switches S–1 through S–6, relative to the instantaneous position of the rotatable member 86 so that the desired time intervals $t_1$ through $t_6$ are positioned in time during the period of the input voltage $V_1$ waveform as seen in FIG. 4.

Figure 6:
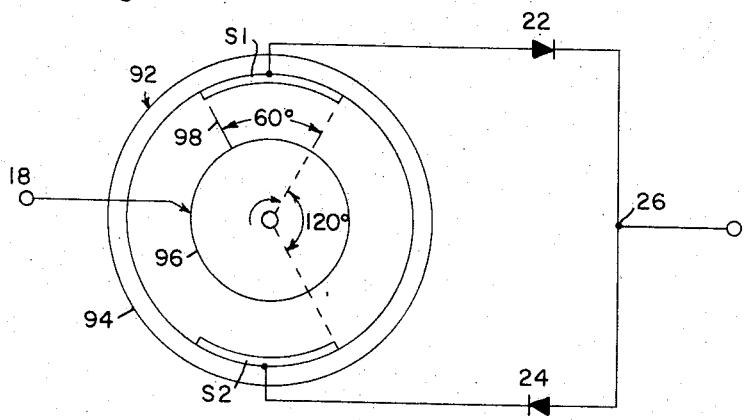

FIG. 6 shows a rotary switch 92 which may be used as the timing device 28 and interrupter 29 of FIG. 1. The rotary switch 92 comprises a circular frame member 94 and a rotatable member 96 axially disposed therein and carrying a contact element 98 which extends along an arc defining an angle of 60 electrical degrees. Two switches S–1 and S–2 serve as interruptors and have an arc length equal to that of the contact element 98 being equally spaced from each other along the periphery of the frame member 94. What has been stated above relating to the angular speed and the relative positions of the members 84 and 86 of the rotary switch 82 and to circuit continuity similarly applies to the rotary switch 92 of FIG. 6.

Figure 7:
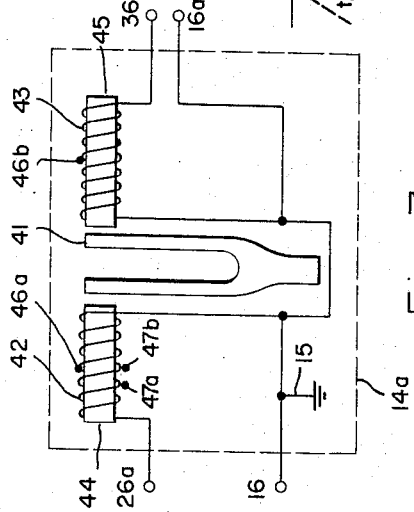
FIG. 7 is a schematic diagram of an electromechanical resonator utilizing a tuning fork, which resonator may replace the resonator set forth in the embodiments of FIGS. 1 and 3.

In FIG. 7, resonator 14a includes a tuning fork 41 resonant at an odd multiple of the input frequency $w_s$, input and output coils 42 and 43 respectively disposed adjacent to the outer portions of the two elongated members of the tuning fork 41. Soft iron cores 44 and 45 may be provided for the coils 42 and 43. The resonator 14a may be coupled to the switching apparatus 12, reference FIG. 1, as a substitute for the resonator 14 thereof by connecting to the junction point 26 and to the terminal 16 the terminals 26a and 16a of the input coil 42. In that event, the output voltage $V_2$ of FIG. 2 may be detected across the output terminals 36a and 16a of FIG. 7. One side of each of the coils 42 and 43 may be connected together and to earth ground at reference numeral 15, as shown. The resonator 14a may also be used in place of the resonator 54 of FIG. 3 by coupling the junction points 65 and 66 at various taps 47a and 47b which may be provided on the input coil 42. Center taps 46a and 46b may also be provided for double ended operation if desired.

Figure 8:
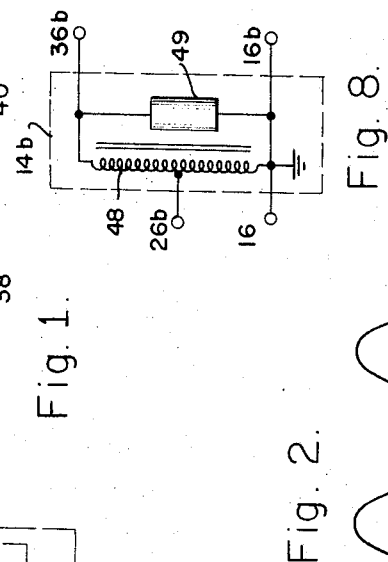
FIG. 8 is a schematic diagram of another resonator utilizing a piezoelectric crystal, which resonator may also be a substitute for the resonator set forth in the embodiments of FIGS. 1 and 3.

FIG. 8 shows another type of resonator 14b that may be used in place of the resonators 14 and 54 of FIGS. 1 and 3 respectively. In FIG. 8, an auto-transformer 48 is shunted by a piezoelectrical crystal 49 having a resonant frequency $w_0$ that is an odd multiple of the frequency $w_s$ of the input voltage $V_1$ of FIGS. 2 and 4. Here, too, known techniques as indicated above may be employed to properly couple the energy transmitted to the resonator 14b, the output of which may be sampled at the output terminals 36b and 16b.

Figures 9, 10:
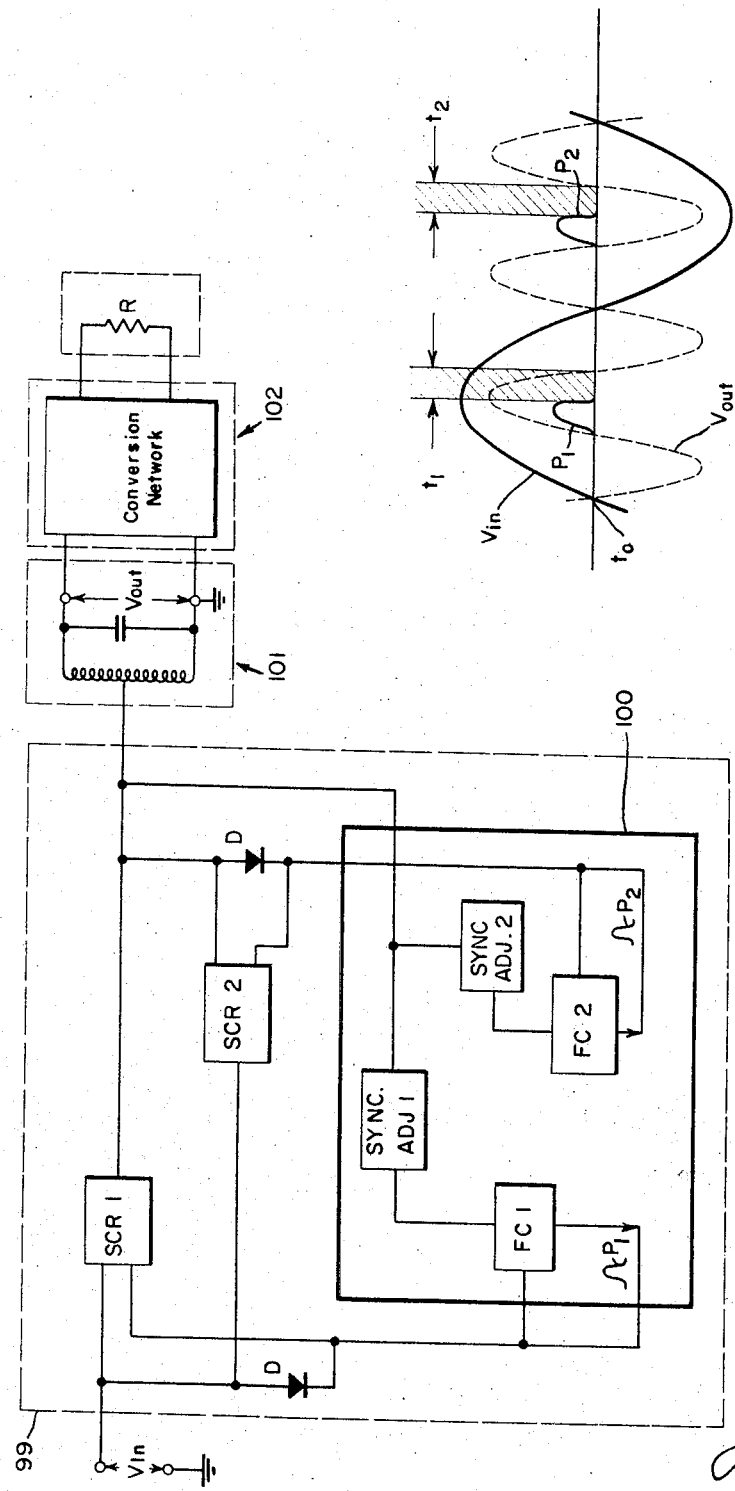
FIG. 9 is a diagram of the synchronous inverter utilizing all electrical components of the embodiment shown in FIG. 1.
FIG. 10 shows the waveform descriptions of the embodiment shown in FIG. 9.

FIG. 9 shows a switching and control apparatus 99 utilizing electronic devices, where silicon controlled rectifiers SCR 1 and SCR 2 are used as interruptors; the timing device 100 uses unijunction transistors as relaxation oscillator firing circuits FC 1 and FC 2, to generate alternate pulses and are set at a third harmonic of the line input $V_{in}$. Here SCR 1 and SCR 2 perform both the switching and rectification functions. Diodes D serve as gates. Resonator 101 is shown connected to the output of the switching apparatus with the output voltage of the resonator designated as $V_{out}$. Within the timing device network 100 are shown potentiometers SYNC ADJ 1 and SYNC ADJ 2 connected between the resonator input line and the respective firing circuits FC1 and FC2 to adjust the respective firing time. Output pulses of firing circuit FC1 is designated $p_1$ and the output of firing circuit FC2 is designated $p_2$.

Operation of the inverter shown in FIG. 9 is described with reference to FIG. 10. The frequency of relaxation oscillators FC1 and FC2 are set to approximately the third harmonic of the line frequency $V_{in}$ and are synchronous to exactly this frequency by SYNC ADJ 1 and SYNC ADJ 2. The synchronous firing circuit FC1 has an output pulse $p_1$ at approximately $t_1$ which when applied to the gate element of the SCR causes SCR 1 to conduct during $t_1$ producing $V_{out}$ from the resonator 101. Similarly, synchronous firing circuit FC 2 has an output pulse $p_2$ which causes SCR 2 to conduct during $t_2$, producing $V_{out}$ from the resonator 101. Of course equivalent transistor circuits may be used in place of SCRs.

Thus, there has been described a synchronous inverter which substitutes a time-based modulator and a resonator for both the input voltage transformer and the LC filter typically employed in conventional devices. Here the input voltage is switch modulated and fed to a resonator during spaced time intervals resulting in an output voltage higher in frequency than that of the input voltage by an odd multiple. With this arrangement, substantial reduction in weight and size as compared to prior art devices is achieved and there results a highly compact and rugged synchronous inverter.

While several embodiments of the invention have been shown and described, it is intended that the foregoing disclosure shall be considered as illustrative of the principles of the invention only and not in any limiting sense.

What is claimed is:
1. In a synchronously controlled AC to AC converter the combination of:
- an electrical energy source of an angular AC frequency, said energy source including an output circuit;
- a first plurality of circuits comprising a first plurality of sequentially operated and parallel coupled circuit interrupters being coupled to the output circuit of said electrical energy source, said first plurality of circuits further comprising a current rectifier being coupled in series with each said interrupter means of said first plurality;
- a second plurality of circuits comprising a second plurality of sequentially operated and parallel coupled interrupter means being coupled to the output circuit of said electrical source and in parallel with said first plurality of circuits, said second plurality of circuits further comprising a current rectifier coupled in series with each interrupter means of said second plurality;
- a resonator means being responsive to the output of said first and said second plurality of circuits, said resonator means being capable of resonating at an odd multiple of the frequency of said electrical energy source; and
- means for synchronously and alternately operating said first and said second plurality of interrupter means through a sequence of operations at predetermined equally spaced time intervals, said means being coupled to said first and said second plurality of circuits, said means being responsive to said electrical source.

2. The electrical circuit as defined in claim 1 wherein: the current rectifiers of said first plurality of circuits are oppositely poled with relation to the current rectifiers in said second plurality of circuits.

3. The electrical frequency converter as defined in claim 1 wherein:
said current rectifier means are diodes.

References Cited

UNITED STATES PATENTS

| | | | |
|---|---|---|---|
| 3,287,622 | 11/1966 | Eckenfelder et al. | 321—69 |
| 2,481,132 | 9/1949 | Lissman | 321—66 X |
| 3,005,169 | 10/1961 | Boyd | 333—71 |
| 3,118,106 | 1/1964 | Robinson | 321—50 X |
| 3,243,711 | 3/1966 | King et al. | 323—22 |

FOREIGN PATENTS

| | | |
|---|---|---|
| 1,281,153 | 11/1961 | France. |
| 1,363,972 | 5/1964 | France. |
| 440,912 | 1/1930 | Great Britain. |

OTHER REFERENCES

Principles and Methods of Telemetering by Borden et al. published Reinhold, 1948, pp. 122 and 123.

JOHN F. COUCH, *Primary Examiner.*

G. GOLDBERG, *Assistant Examiner.*